April 7, 1959

J. H. APEL 2,880,832

COMBINATION CLUTCH AND GEAR SHIFT CONTROL FOR MIXER UNITS

Filed July 29, 1957

*INVENTOR.*
JOHN H. APEL

BY CORBETT, MAHONEY,
MILLER & RAMBO, ATTYS

April 7, 1959  J. H. APEL  2,880,832
COMBINATION CLUTCH AND GEAR SHIFT CONTROL FOR MIXER UNITS
Filed July 29, 1957  2 Sheets-Sheet 2

*INVENTOR.*
JOHN H. APEL
BY CORBETT, MAHONEY,
MILLER & RAMBO, ATTYS.
BY

United States Patent Office 2,880,832
Patented Apr. 7, 1959

2,880,832

COMBINATION CLUTCH AND GEAR SHIFT CONTROL FOR MIXER UNITS

John H. Apel, Columbus, Ohio, assignor to The Jaeger Machine Company, Columbus, Ohio, a corporation of Ohio Application July 29, 1957, Serial No. 674,763

3 Claims. (Cl. 192—3.5)

My invention relates to a combination clutch and gear shift control for mixer units. It has to do, more specifically, with control mechanism which can be actuated to control simultaneously the clutch and to shift a forward and reverse gear drive unit for driving the rotatable drum of a mixer unit, for example, of a truck mixer unit. The control mechanism, according to my invention, may also include means for controlling a brake unit for the mixer drum and the throttle of the engine which supplies power for the drum drive unit.

It is the main object of my invention to provide simple and inexpensive clutch and gear shift control mechanism in which a single operating hand lever is used to release the clutch and shift the forward and reverse drive gears, and in which the clutch is then automatically engaged to drive the mixer drum in the selected direction, either for mixing or for discharge.

Another object of my invention is to provide control mechanism of the type indicated which is so constructed and arranged that it will be impossible to shift the forward or reverse drive gears unless the clutch is disengaged and, therefore, it will be impossible to clash the gears regardless of how quickly the control lever is moved.

Another object of my invention is to provide control mechanism of the type indicated which is preferably provided with means to apply the mixer drum brake as the clutch is disengaged for gear shifting and release it each time the clutch is re-engaged so that the mixer drum will always be under control.

A further object of my invention is to provide control mechanism of the type indicated which also is preferably provided with throttle control means which will move the throttle to a pre-set speed position each time the clutch is engaged after shifting the forward or reverse drive gears and which will move the throttle control to idle position each time the clutch is disengaged for shifting the gears.

Still another object of my invention is to provide control mechanism of the type indicated in which the mechanism itself does not have springs, the force of which must be overcome in the shifting operation and, therefore, the only resistance which must be overcome is that inherent in the clutch, gear, brake or throttle units themselves.

Various other objects will be apparent.

In the accompanying drawings, I have illustrated the preferred embodiment of my invention but it is to be understood that details thereof may be varied.

Figure 1:
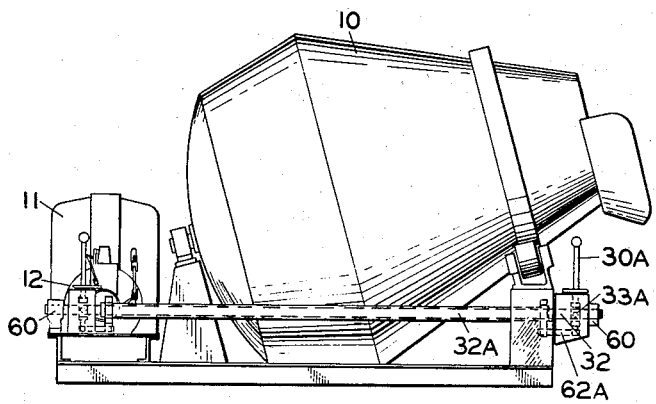
Figure 1 is a diagrammatic view illustrating my combination clutch and gear shift control mechanism applied to a mixer unit.

With reference to the drawings, in Figure 1 I have illustrated a type of mixer unit to which my invention may be applied and which is adapted to be mounted on a truck or other vehicle. This unit consists of a mixing drum 10 which is supported for rotation about its axis and is driven by an engine 11 through a suitable transmission unit 12.

Figure 4:
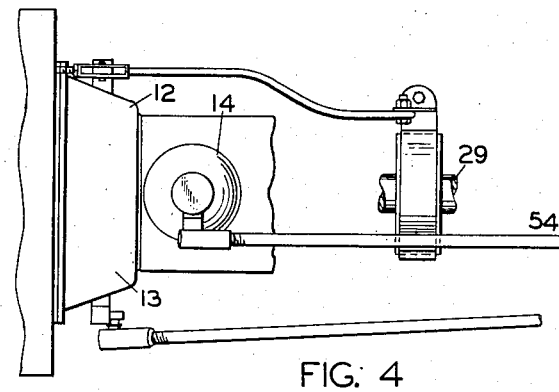
Figure 4 is a plan view showing the duplicate lever controls for the shifting mechanism.
Figure 6:
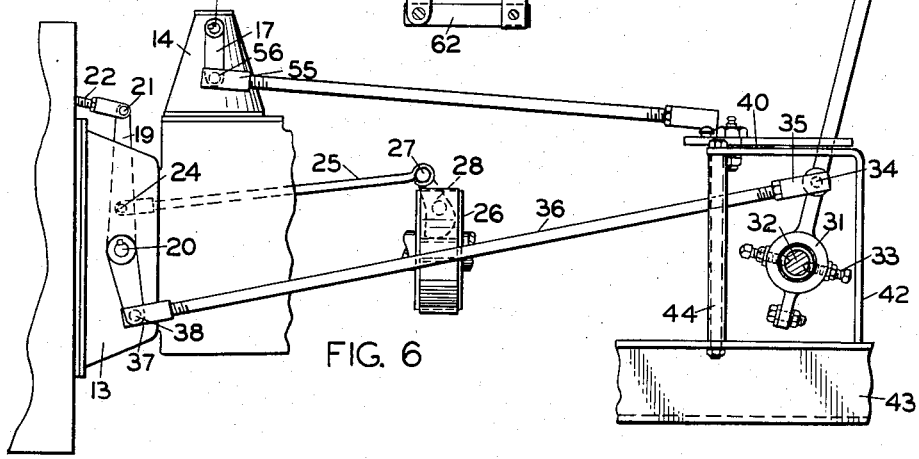
Figure 6 is a side elevational view of the control mechanism.

The transmission 12, as indicated in Figures 4 and 6, includes the driving clutch 13 and the forward and reverse gear unit 14. The unit 13 is a spring-loaded clutch of the automotive type which must be released each time the gears of the unit 14 are shifted and then engaged to drive the mixing drum 10 in either a forward or a reverse direction. The unit 14 may be of any suitable type of gear unit which can be shifted to selectively drive the mixing drum in either a forward or a reverse direction. The reversing gear unit 14 is actuated by a depending arm 17 keyed on the rod shaft 18 and the clutch 13 is actuated by multiple arm 19 keyed on a rock shaft 20.

Figure 2:
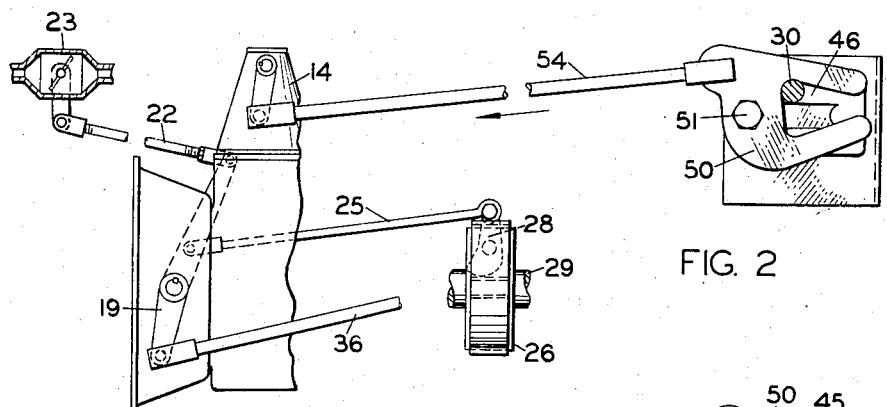
Figure 2 is a plan view of the shifting mechanism showing it in forward drive position.
Figure 3:
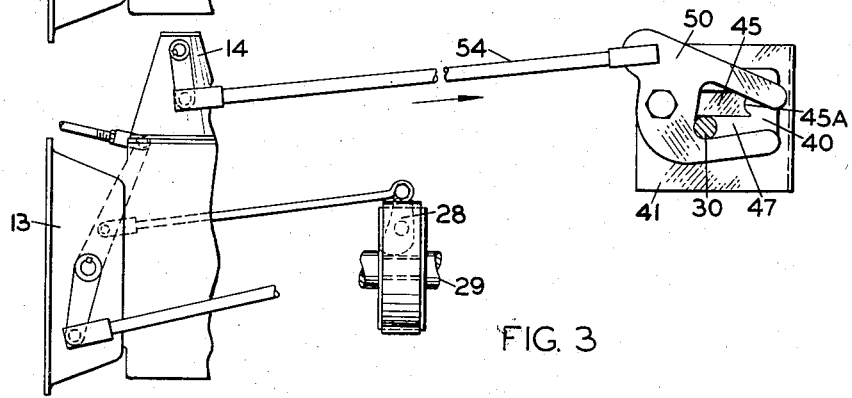
Figure 3 is a similar view showing the mechanism in reverse drive position.

The arm 19 is provided with an upstanding part which is pivoted at 21, at its upper end, to a throttle actuating rod 22 that, as shown in Figures 2 and 3, controls the fuel supply valve which is here shown as a butterfly valve 23 of the internal combustion engine 11. Intermediate the points 20 and 21, the upstanding part of the arm 19 is pivoted at 24 to an actuating rod 25 which actuates a brake unit 26. The rod 25 is pivoted at 27 to the cam 28 that applies or releases the brake unit 26. This brake unit controls the shaft 29 which is the shaft that drives the drum 10, as shown in Figure 1.

I provide actuating mechanism of such a nature that by merely shifting a single operating lever 30 between forward and reverse drive positions, the arms 17 and 19 will be rocked to first release the clutch 13, then to shift the gears of unit 14, and finally to re-engage the clutch. This actuating mechanism also serves to rock the brake actuating cam 28 and moves the throttle actuating rod 22. As previously indicated, the brake 26 will be applied as the clutch 13 is disengaged for gear shifting and will be released each time the clutch is re-engaged so that the mixer drum will always be under control. The throttle will always be moved by the rod 22 to a preset speed position each time the clutch is engaged after shifting the forward or reverse drive gear unit 14 and will be moved to idle position each time the clutch is disengaged for shifting the gear unit.

Figure 5:
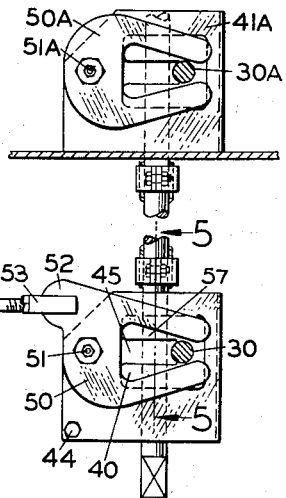
Figure 5 is a vertical sectional view taken along line 5—5 of Figure 4.
Figure 5:
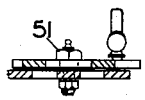
Figure 5:
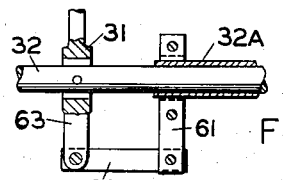

As shown best in Figures 4 to 6, the actuating or control mechanism includes the operating hand lever 30 previously mentioned, which is mounted for universal rocking movement and is always disposed in substantially upright position. This lever 30 has a ring 31 on its lower end which slips loosely over a shaft 32. The ring 31 is keyed to the shaft 32 (Figure 6) by the diametrically opposed threaded pins 33 in the ring which engage the shaft so that the lever can be used to rotate the shaft. Furthermore, the lever 30 can be rocked in the direction of the axis of the shaft about the pins 33. The shaft 32, as will later appear more clearly, is rotatably disposed within a tube 32a, and is rotatably mounted on the mixer frame 43 in any suitable manner but preferably, as will later appear, extends from the forward part of the mixer unit adjacent the engine 11 to the rear part of the mixer unit adjacent the discharge end thereof.

Above the shaft 32, the lever 30 is connected at a pivot point 34 to a clevis 35 adjustably mounted on the end of an actuating rod 36. This rod extends to the lower end of the actuating arm 19 where it is provided with an adjustable clevis 37 that is pivoted at 38 to the lower end of the arm 19.

Above the pivot 34, the hand operating lever 30 operates within a guide slot 40. This slot 40 is formed in a horizontally disposed plate 41 on the upper end of an inverted L-bracket 42 which is rigidly secured at its lower end to the frame 43 and is braced by spacers and bolts 44. The slot 40 is of U-form being divided by a central finger 45 which, on its outer end, is provided with a notch 45a for receiving the lever 30 and retaining it in neutral position. One side portion 46 of the slot is the forward drive position for the lever 30, as shown in Figure 2, and the other side 47 is the reverse drive position for the lever, as shown in Figure 3. Thus, the guide plate 41 provides definite positions for forward and reverse drive at each side of neutral and a definite position for neutral. The lever 30 will be retained in the neutral notch 45a or in the inner end of either of the slot portions 46 or 47 by the normal pull exerted on the rod 36 through the medium of the clutch engaging springs in the clutch 13. When the lever 30 is shifted in either direction from neutral, it will enter a definite forward or reverse drive position. If the shift is from one side of neutral to the other, that is, from forward to reverse or, vice versa, there will be a definite pause as the lever enters the notch 45a in neutral position, during its passage between forward and reverse position.

Pivoted to the guide plate 41 and superimposed relative thereto is a bell crank lever 50 of horse-shoe shape. The lever 50 is pivoted at 51 to the plate 41 and is provided with a projecting pivot lug 52 by means of which it is pivoted to the adjustable clevis 53 in the end of an actuating rod 54. This rod 54 is provided with an adjustable clevis 55 on its opposite end which is pivoted at 56 to the lower end of the clutch actuating arm 17. Rocking of the bell crank lever 50 from the neutral position shown in Figure 4, in either direction, will shift the gear unit 14. The slot 57 in the bell crank lever 50 converges towards its outer end to a width just slightly greater than the diameter of the lever 30, as shown in Figure 4, whereas at its inner end, it is substantially wider than the finger 45.

In the operation of this control mechanism, the neutral position is indicated in Figure 4. At this time, the clutch 13 is disengaged and the gear unit 14 is disengaged or in neutral condition. At the same time, the brake 26 is applied and the throttle lever 22 is in idle position. If the operating lever 30 is now moved from the neutral notch 45a into the slot portion 46 to forward drive position, the bell crank lever 50 will be rocked about the pivot 51, upwardly with reference to Figure 2, until the lever 30 is in the inner end of the slot portion 46. This rocking movement of the lever 50 will exert a push on the rod 54, as indicated by the arrow in Figure 2, and will shift the gear unit 14. At the same time that the lever 30 is moved to the forward drive position, it exerts a push on the rod 36 which actuates the arm 19. This will engage the clutch 13 and the arm 19 will exert a push on the rod 25 to release the brake 26 and a pull on the rod 22 to move the throttle to the set speed condition. Movement of the lever 30 back to neutral position will disengage the clutch 13, apply the brake 26, and move the throttle control rod 22 to idle speed position. If the lever 30 is shifted into the slot 47, swinging the lever 50 downwardly as viewed in Figure 3, a pull will be exerted on the rod 54, as indicated by the arrow, shifting the gear unit 14 into reverse drive position. At the same time, the lever 30 will exert a push on the rod 36 which, as before, will engage the clutch, release the brake 26, and set the throttle control rod 22 in the set speed position.

Figure 7:
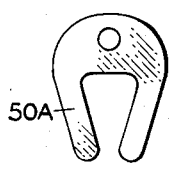
Figure 7 is a plan view of the duplicate shifting bell crank lever.
Figure 8:
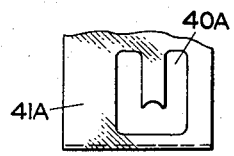
Figure 8 is a plan view of the plate with the guide slot for the operating hand lever.

As indicated in Figure 1, it is desirable to duplicate the hand lever control at the rear of the mixer so that the operator can stand adjacent the discharge end when the mixer contents are to be discharged. Therefore, the lever 30a is mounted at the rear and operates in a slot 40a which is provided in the plate 41a secured to the frame 43. This plate 41a (Figure 8) is identical with the plate 41. A second horse-shoe shaped plate 50a (Figure 7) is provided and is pivoted to the plate 41a at 51a, being identical with the plate 50 except it is not provided with a pivot lug equivalent to the lug 52. The lever 30a is connected to the shaft 32 by a ring and pivot structure 33a (Figure 1) exactly as at the other end.

As previously indicated, the shaft 32 is suitably rotatably mounted on the mixer frame 43 as by the bearings 60. The tube 32a is slidably mounted on the shaft 32. At its forward end the sleeve is provided with a depending arm 61 clamped thereto for rotating and sliding movement therewith. The lower end of this arm is connected by a pivoted link 62 to the depending end 63 of the lever 30. Thus, when the lever 30 rotates the shaft 32, the tube 32a can rotate therewith and when the lever 30 is rocked about the pivots 33, the tube 32a will be moved axially of the shaft 32 through the medium of the link 62. The opposite or rear end of the tube 32a is connected to the operating lever 30a in an identical manner by the structure indicated generally at 62a in Figure 1. Thus, when one or the other operating levers 30 or 30a is moved by the operator, the movement of the other lever is identical. Either lever can be used to obtain the desired control of the clutch unit 13, the gear unit 14, the brake unit 26 and the throttle 23.

It will be apparent from the above description that I have provided simple and inexpensive control mechanism for the clutch and forward and reverse drive unit of a mixer or the like. Various advantages of this arrangement have been discussed above and others will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination with a shaft to be driven, a driving transmission for the shaft including a driving clutch unit and a forward and reverse unit, an operating lever, and mechanism for connecting said operating lever to said clutch unit and forward and reverse unit so that movement of the lever in either direction from neutral clutch disengaged position engages the clutch unit and actuates the forward and reverse unit to drive the driven shaft in a selected direction, said mechanism including a guide plate for said lever having definite neutral forward and reverse positions, for receiving and locating the operating lever, said guide plate having a U-shaped slot with the forward and reverse positions in the ends of the U and the neutral position midway therebetween, said lever being mounted for rocking movement into any of such positions, an actuating connection between the lever and the clutch, a bell crank lever movable upon rocking of said operating lever, means connecting said bell crank lever to said forward and reverse unit, said bell crank lever being pivotally mounted in association with said guide plate and being movable about its pivot by rocking of the operating lever, said bell crank lever being of horse-shoe shape and being superimposed relative to the guide plate and said operating lever projecting through said U-shaped guide slot and within the bell crank lever, said horseshoe bell crank lever being pivoted to the guide plate at the closed end of the horse-shoe plate and between the inner ends of the guide slot.

2. In combination with a shaft to be driven, a driving transmission for the shaft including a driving clutch unit and a forward and reverse unit, an operating lever, and mechanism for connecting said operating lever to said clutch unit and forward and reverse unit so that movement of the lever in either direction from neutral clutch disengaged position engages the clutch unit and actuates the forward and reverse unit to drive the driven shaft in a selected direction, said mechanism including a guide plate for said lever having definite neutral forward and reverse positions, for receiving and locating the operating lever, said guide plate having a U-shaped slot with the forward and reverse positions in the ends of the U and the neutral position midway therebetween, said lever being mounted for rocking movement into any of such positions, and actuating connection between the lever and the clutch, a bell crank lever movable upon rocking of said operating lever, means connecting said bell crank lever to said forward and reverse unit, said bell crank lever being pivotally mounted in association with said guide plate and being movable about its pivot by rocking of the operating lever, said actuating connection between the operating lever and the forward and reverse drive unit comprising a rod connected to the bell crank lever and an actuating arm of the forward and reverse unit, the actuating connection between the operating lever and the clutch comprising a rod pivoted to the operating lever and to an actuating arm of the clutch, said operating lever being mounted on a shaft for rocking the shaft and for rocking axially of the shaft, a duplicate operating lever associated with a duplicate guide plate and bell crank lever at a remote point to which said shaft extends, said duplicate operating lever being connected to the shaft for rocking it or rocking axially of it, a tube rotatably and slidably disposed on the shaft, and means for connecting the opposed ends of the tube to the two operating levers so that the rocking movement of either lever will be duplicated at the other lever.

3. In combination with a shaft to be driven, a driving transmission for the shaft including a driving clutch unit and a forward and reverse unit, an operating lever, and mechanism for connecting said operating lever to said clutch unit and forward and reverse unit so that movement of the lever in either direction from neutral clutch disengaged position engages the clutch unit and actuates the forward and reverse unit to drive the driven shaft in a selected direction, said mechanism including a guide plate for said lever having definite neutral forward and reverse positions, for receiving and locating the operating lever, said guide plate having a U-shaped slot with the forward and reverse positions in the ends of the U and the neutral position midway therebetween, said lever being mounted for rocking movement into any of such positions, an actuating connection between the lever and the clutch, a bell crank lever movable upon rocking of said operating lever, means connecting said bell crank lever to said forward and reverse unit, said bell crank lever being pivotally mounted in association with said guide plate and being movable about its pivot by rocking of the operating lever, said operating lever being keyed to a shaft for rocking it but being pivoted to the shaft for rocking in the direction of the axis of the shaft, a duplicate operating lever being similarly mounted on the opposed end of the shaft and being associated with duplicate members like the guide plate and bell crank lever, and a connecting member having its opposed ends connected to the two operating levers so that rocking of one lever axially of the shaft will be duplicated by the other lever.

References Cited in the file of this patent

UNITED STATES PATENTS

| 1,452,296 | Howard | Apr. 17, 1923 |
| 1,483,231 | Maynard | Feb. 12, 1924 |
| 2,104,608 | Cox et al. | Jan. 4, 1938 |
| 2,321,098 | Morse | June 8, 1943 |
| 2,645,947 | Lendved et al. | June 21, 1953 |
| 2,719,439 | Driehaus | Oct. 4, 1955 |
| 2,743,798 | Apel et al. | May 1, 1956 |